US012631234B2

(12) United States Patent
Szafnauer et al.

(10) Patent No.: US 12,631,234 B2
(45) Date of Patent: May 19, 2026

(54) DRUM BRAKE

(71) Applicant: Meritor Heavy Vehicle Braking Systems (UK) Limited, Cwmbran (GB)

(72) Inventors: Alex Szafnauer, Cwmbran (GB); Sean Cleary, Cwmbran (GB)

(73) Assignee: Meritor Heavy Vehicle Braking Systems (UK) Limited (GB)

( * ) Notice: Subject to any disclaimer, the term of this patent is extended or adjusted under 35 U.S.C. 154(b) by 683 days.

(21) Appl. No.: 17/892,470

(22) Filed: Aug. 22, 2022

(65) Prior Publication Data

US 2023/0105818 A1 Apr. 6, 2023

(30) Foreign Application Priority Data

Oct. 6, 2021 (EP) ..................................... 21201299

(51) Int. Cl.
| | |
|---|---|
| *F16D 66/02* | (2006.01) |
| *F16D 65/08* | (2006.01) |
| *F16D 65/10* | (2006.01) |

(52) U.S. Cl.
CPC ........... *F16D 66/021* (2013.01); *F16D 65/08* (2013.01); *F16D 65/10* (2013.01)

(58) Field of Classification Search
CPC .................................................... F16D 66/021
See application file for complete search history.

(56) References Cited

U.S. PATENT DOCUMENTS

| | | | | |
|---|---|---|---|---|
| 2,674,351 A | * | 4/1954 | Ray | F16D 65/561 |
| | | | | 188/79.63 |
| 2002/0195298 A1 | * | 12/2002 | Borugian | B60T 17/221 |
| | | | | 340/453 |
| 2020/0011390 A1 | | 1/2020 | Drzevieski et al. | |

FOREIGN PATENT DOCUMENTS

| | | | | | |
|---|---|---|---|---|---|
| CN | 212155571 U | * | 12/2020 | | |
| HU | 222005 B1 | * | 3/2003 | ............. | F16D 51/22 |
| JP | H06171498 A | * | 6/1994 | | |
| KR | 20050098321 A | | 10/2005 | | |
| RU | 2221174 C2 | * | 1/2004 | ........... | F16D 65/563 |

OTHER PUBLICATIONS

Extended European Search Report dated Mar. 28, 2022 for related European Appln. No. 21201299.1; 8 Pages.

* cited by examiner

*Primary Examiner* — Melody M Burch
(74) *Attorney, Agent, or Firm* — Dickinson Wright PLLC

(57) ABSTRACT

A drum brake assembly that includes a brake drum, first and second brake shoes, a cam shaft, a first tappet, a second tappet, and a wear adjuster mechanism. The wear adjuster mechanism has a cross shaft and a sensor. The sensor is configured to detect rotation of the cross shaft about a longitudinal axis to monitor wear of the first and second brake shoes and a braking surface of the brake drum.

13 Claims, 7 Drawing Sheets

DRUM BRAKE

TECHNICAL FIELD

The present invention relates to a drum brake assembly for a heavy commercial vehicle, and to a method of monitoring wear for a drum brake assembly for a heavy commercial vehicle.

BACKGROUND

A vehicle drum brake assembly includes a brake drum that rotates about an axis with a wheel of the vehicle. Located within an inner cavity of the brake drum is a non-rotating brake structure that includes brake shoes with brake linings of friction material. During a vehicle braking event, the brake shoes bring the brake linings into frictional contact with a braking surface formed as part of an inner surface of the brake drum. Repeated contact between the friction material and the brake drum causes wear to the friction material, as well as to the braking surface of the brake drum.

One form of drum brake assembly is a "Z cam" assembly, where a cam shaft, operated by an actuator such as an air actuator, is rotated to cause rods supported within an end of the cam shaft to move the brake shoes towards the respective braking surfaces, i.e., to apply the drum brake. Such a drum brake assembly can include an internal wear adjuster mechanism in order to account for wear of the friction material and/or brake drum. That is, a wear adjuster mechanism is provided in the transmission path after the cam shaft, rather than as a slack adjuster external to the brake drum and positioned in a transmission path before the cam shaft, as seen in "S cam" drum brakes.

In such a "Z cam" drum brake assembly, the rods cause first and second tappets to move outwardly from the cam shaft in a broadly circumferential direction in order to actuate the respective first and second brake shoes. The wear adjuster mechanism acts to extend the length of the tappets in order to account for wear. As described in further detail below, it is known for a wear adjuster mechanism to be self-adjusting, so that the wear adjuster mechanism is activated to account for wear with each brake application.

Periodic inspection is required in order to determine whether the brake shoes and/or brake drum need replacement, i.e., if the brake shoes or brake drum have been worn past a certain point where effective braking can no longer be carried out. However, relying on visual inspection of the components of the drum brake assembly is inefficient. Consumable parts of the brake assembly such as brake shoes are replaced based on scheduled maintenance, so that replacement may take place before such a part has reached its full usable life. There is also a risk that such parts may be used beyond their life, in which case damage may be caused to the drum brake by failure to replace them in time. This can lead to an increase in downtime for the vehicle in order for repair to be carried out.

In such a drum brake assembly it can be difficult to establish running clearance of the brake, i.e., the gap between the brake shoes and the braking surface of the brake drum when the drum brake is not actuated that allows the brake drum to move freely. In order for the drum brake assembly to be used most efficiently, running clearance should be minimized, so that application of the drum brake occurs as soon as possible after a command is given by an operator. Without any indication of the state of wear, the running clearance cannot be known, so that running clearance cannot be optimized. Unwanted contact of the brake shoes with the drum brake between brake applications may take place, which can cause unnecessary brake shoe wear (leading to a reduction of life of the brake shoes), brake drum wear, drag, lower vehicle efficiency and higher fuel consumption. Springs are used to retract brake shoes from the brake drum following a braking operation, but without wear indication it can be difficult to ensure unwanted contact between the brake shoe and a brake drum is not taking place. The present teachings seek to overcome or at least mitigate the problems of the prior art.

SUMMARY

A first aspect of present teachings provides a drum brake assembly for a heavy commercial vehicle, the drum brake assembly comprising a brake drum; first and second brake shoes to be moved towards a braking surface of the brake drum during a braking operation; a cam shaft for transmitting braking force from an actuator to apply the brake; a first tappet and a second tappet for transmitting braking force from the cam shaft to the first and second brake shoes; a wear adjuster mechanism for adjusting the first and second tappets to address wear of the brake shoes and the braking surface of the brake drum, the wear adjuster mechanism comprising a cross shaft for transmitting rotational force from the first tappet to the second tappet; and a sensor for detecting rotation of the cross shaft about a longitudinal axis of the cross shaft in order to monitor wear of the brake shoes and the braking surface of the brake drum.

Detecting rotation of the cross shaft of the adjuster mechanism allows net adjustment made to account for wear to be calculated, so that the cumulative level of wear of friction material of the brake shoes and of the brake drum can be calculated. Maintenance of the drum brake assembly can be planned without the need for inspection, i.e., replacement of brake shoes can be planned and unnecessary servicing can be avoided. Damage caused by the use of parts beyond their life can also be avoided, leading to reduced downtime for repair of such damage. Use of consumable parts such as brake shoes can be optimized, as premature replacement can be avoided, ensuring that the full usable life of consumable parts is utilized.

Calculating brake shoe and brake drum wear via measurement of cross shaft rotation enables accurate measurement. Measurement of cross shaft rotation can be relatively simply carried out.

In exemplary embodiments, the sensor is configured to continuously detect rotation of the cross shaft, such that wear of the brake shoes and the braking surface is continuously monitored.

Continuous detection of wear allows the current state of wear to be known, rather than wear being detected incrementally, and the state of wear being updated at different stages.

In exemplary embodiments, the sensor is mounted on the cam shaft.

The cam shaft is a suitable mounting point for the sensor, allowing a compact arrangement where wear of the brake shoes and the braking surface of the brake drum can be monitored.

In exemplary embodiments, the sensor is configured to detect angular displacement of the cam shaft about the longitudinal axis of the cam shaft.

Mounting the sensor on the cam shaft, and providing a sensor configured to detect angular displacement of the cam shaft, allows the same sensor to detect the stroke of the cam shaft on each application of the drum brake. Running clearance between the brake shoes and a braking surface of the brake drum can thus be monitored, advantageously using the same sensor provided for wear detection. Monitoring running clearance allows determination of whether the brake adjuster is working optimally, and/or whether the brake adjuster is working correctly.

In exemplary embodiments, the drum brake assembly further comprises a rotation indicator for indicating rotation of the cross shaft to the sensor, wherein the rotation indicator includes a first portion configured for movement with the cross shaft, and a second portion engaged with the first portion such that movement of the first portion causes proportional movement of the second portion, wherein the sensor is configured to detect movement of the second portion.

Measuring rotation of the cross shaft allows a simple and effective form of wear detection, where an indicator comprising a portion on the cross shaft can be used to provide accurate detection of rotation of the cross shaft. With such an arrangement, a sensor of the type that can also be used to detect rotation of the cam shaft can be used, so allowing running clearance detection without the need for an additional sensor.

In exemplary embodiments, the first portion comprises a threaded portion of the cross shaft.

In exemplary embodiments, the threaded portion is integral to the cross shaft, or the threaded portion comprises an externally threaded sleeve mounted to the cross shaft for rotation with the cross shaft.

In exemplary embodiments, the second portion comprises a gear with teeth corresponding to the thread of the first portion, such that rotation of the threaded portion with the cross shaft causes rotation of the gear.

Such an arrangement is a simple and accurate means of monitoring rotation of the cross shaft. Rotation of the gear is easily detected by the sensor, so that rotation of the cross shaft can be detected and wear of the brake shoes and braking surface can be calculated.

In exemplary embodiments, the gear is mounted on the cam shaft.

The gear being mounted on the cam shaft provides an advantageously compact arrangement, and facilitates use of the same sensor for detecting rotation of the cross shaft and angular displacement of the cam shaft, due to the proximity of the gear and the cam shaft.

In exemplary embodiments, when the sensor is mounted on the cam shaft, the gear is mounted on the cam shaft via the sensor.

When the sensor is mounted on the cam shaft, mounting the gear on the cam shaft via the sensor allows an advantageously compact arrangement and improves ease of detection.

In exemplary embodiments, the second portion comprises a collar mounted on the cross shaft, and an arm, wherein the collar comprises an internal thread for engaging the threaded portion and a radial projection configured to engage the arm such that rotation of the cross shaft causes axial movement of the collar with respect to the cross shaft, and pivoting of the arm about a first end of the arm, and wherein the sensor is configured to detect pivoting of the arm.

Such an arrangement is a simple and accurate means of monitoring rotation of the cross shaft. Pivoting of the arm is easily detected by the sensor, so that rotation of the cross shaft can be detected and wear of the brake shoes and braking surface can be calculated.

In exemplary embodiments, the first end of the arm is mounted on the cam shaft.

The arm being mounted on the cam shaft provides an advantageously compact arrangement, and facilitates use of the same sensor for detecting rotation of the cross shaft and angular displacement of the cam shaft, due to the proximity of the gear and the cam shaft.

In exemplary embodiments, when the sensor is mounted on the cam shaft, the first end of the arm is mounted on the cam shaft via the sensor.

When the sensor is mounted on the cam shaft, mounting the arm on the cam shaft via the sensor allows an advantageously compact arrangement and improves ease of detection of movement.

In exemplary embodiments, the drum brake assembly further comprises a housing, wherein the sensor is mounted to the housing.

In exemplary embodiments, the sensor is an encoder, or the sensor is a potentiometer.

In exemplary embodiments, the drum brake assembly further comprises a control system for monitoring wear of the brake shoes and the braking surface, wherein the control system is configured to calculate wear from cumulative motion of the cross shaft during multiple braking operations.

In exemplary embodiments, the control system comprises an indicator for indicating the state of wear of the brake shoes and/or the braking surface.

There is also provided a method of monitoring wear of the brake shoes and the braking surface of the drum brake assembly described above, the method comprising the steps of: detecting motion of the cross shaft via the sensor; and using the control system to calculate wear from cumulative motion of the cross shaft.

In exemplary embodiments, the method further comprises the step of providing an indication to an operator of the state of wear of the brake shoes and/or the braking surface.

There is further provided a drum brake assembly for a heavy commercial vehicle, the drum brake assembly comprising: a brake drum; first and second brake shoes to be moved towards a braking surface of the brake drum during a braking operation; a cam shaft for transmitting braking force from an actuator to apply the brake; a first tappet and a second tappet for transmitting braking force from the cam shaft to the first and second brake shoes; a wear adjuster mechanism for adjusting the first and second tappets to address wear of the brake shoes and the braking surface of the brake drum; and a sensor configured to detect angular displacement of the cam shaft about the longitudinal axis of the cam shaft.

Providing a sensor configured to detect angular displacement of the cam shaft allows detection of the stroke of the cam shaft on each application of the drum brake. Running clearance between the brake shoes and a braking surface of the brake drum can thus be monitored to detect whether the drum brake is at its optimum setting, without the use of an additional sensor.

In exemplary embodiments, the sensor is mounted on the cam shaft.

Mounting the sensor on the cam shaft allows accurate monitoring of angular displacement of the cam shaft in a compact arrangement.

BRIEF DESCRIPTION OF THE DRAWINGS

Embodiments will now be described, by way of example only, with reference to the accompanying figures, in which.

DETAILED DESCRIPTION

As required, detailed embodiments of the present invention are disclosed herein. It is to be understood that the disclosed embodiments are merely exemplary and that various and alternative forms are possible. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ embodiments according to the disclosure.

It will also be understood that, although the terms first, second, etc. are, in some instances, used herein to describe various elements, these elements should not be limited by these terms. These terms are only used to distinguish one element from another. For example, a first element could be termed a second element, and similarly a second element could be termed a first element without departing from the scope of the various described embodiments. The first element and the second element are both elements, but they are not the same element.

The terminology used in the description of the various described embodiments is for the purpose of describing particular embodiments only and is not intended to be limiting. As used in the description of the various described embodiments and the appended claims, the singular forms "a", "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Figure 1:
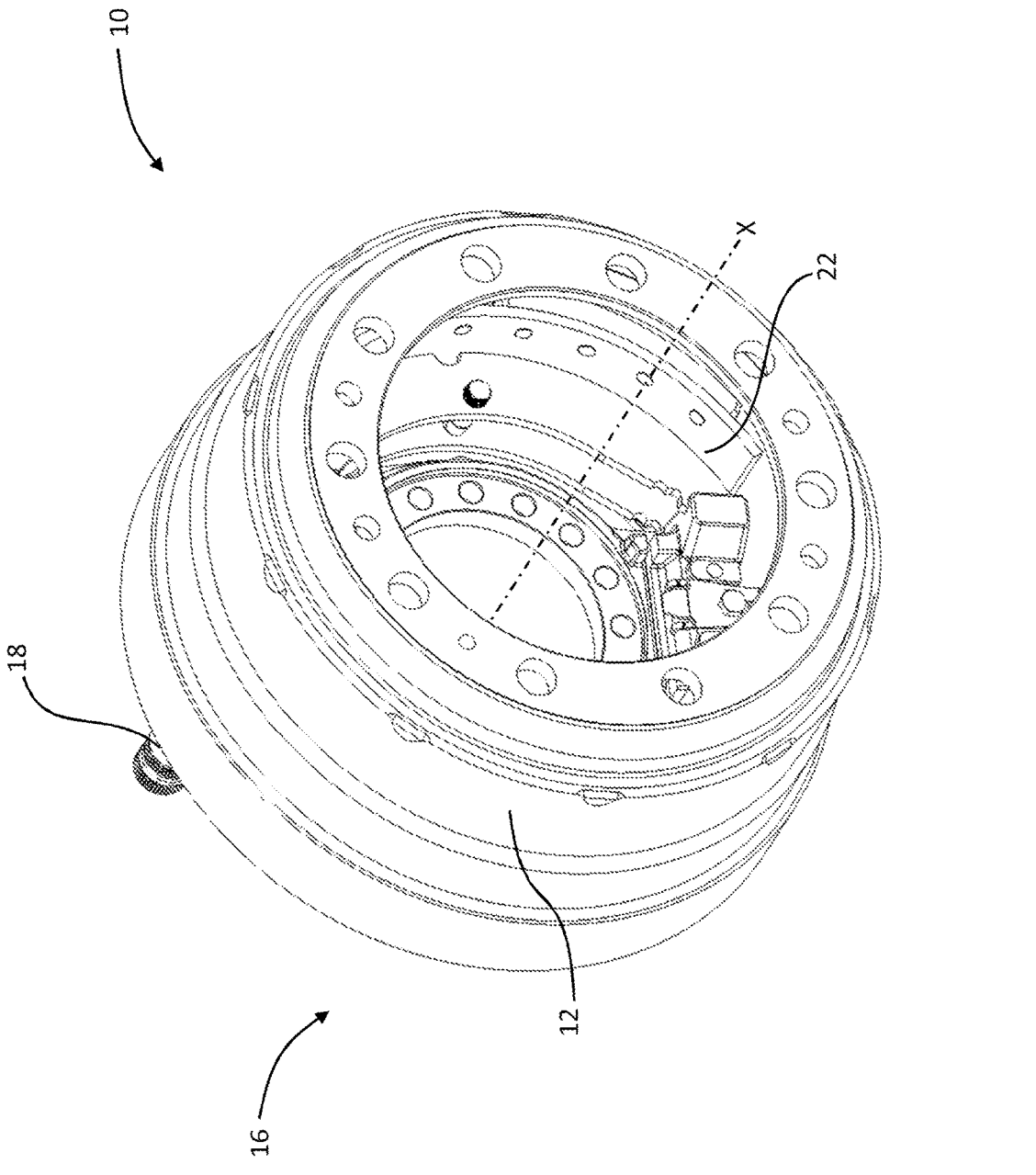
FIG. 1 is a perspective view of a drum brake assembly according to a first embodiment.
Figure 2:
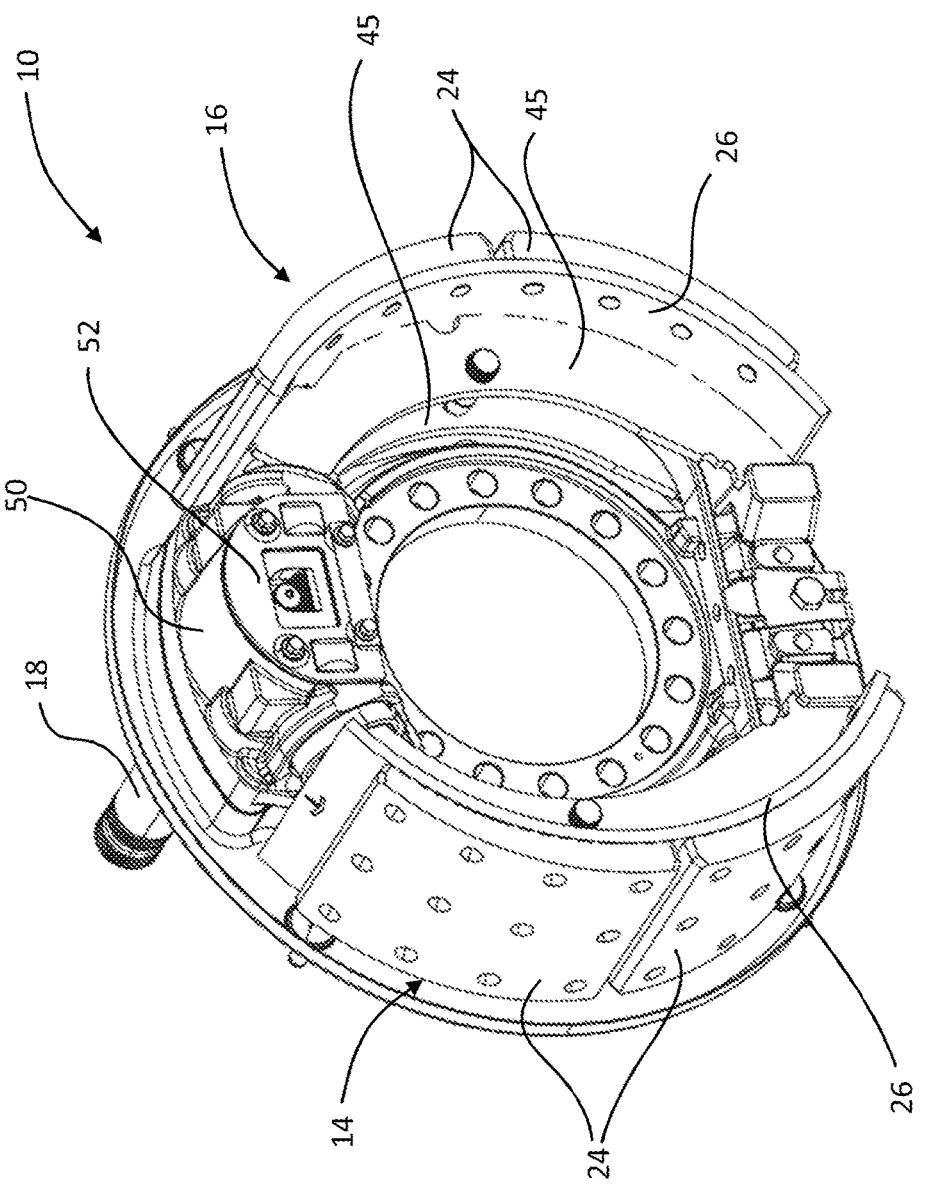
FIG. 2 is a perspective view of the drum brake assembly of FIG. 1 with the brake drum removed to improve clarity.

FIGS. 1 and 2 show a drum brake assembly 10 for a heavy commercial vehicle according to a first embodiment. The drum brake 10 includes a cylindrical brake drum 12 and first 14 and second 16 brake shoe assemblies that are moveable into engagement with the brake drum 12 by a cam shaft 18. The cam shaft 18 can be actuated pneumatically or hydraulically.

The brake drum 12 is rotatable about an axis X. The brake drum 12 has an inner peripheral surface. The brake shoe assemblies 14, 16 are located within an internal cavity 22 of the brake drum 12, adjacent to the inner peripheral surface (not shown). The brake shoe assemblies 14, 16 include brake linings 24 of friction material. The brake linings 24 are attached to a backing plate 26 of each assembly 14, 16. In this embodiment, each brake shoe assembly 14, 16 has two portions of friction material 24. In alternative embodiments, each brake shoe assembly has a single portion of friction material, or three or more portions of friction material.

The inner peripheral surface of the brake drum 12 forms a braking surface. When the drum brake 10 is applied during a braking event, the brake linings 24 are moved into contact with the braking surface following actuation of the brake shoe assemblies 14, 16 by the cam shaft 18.

Figure 3:
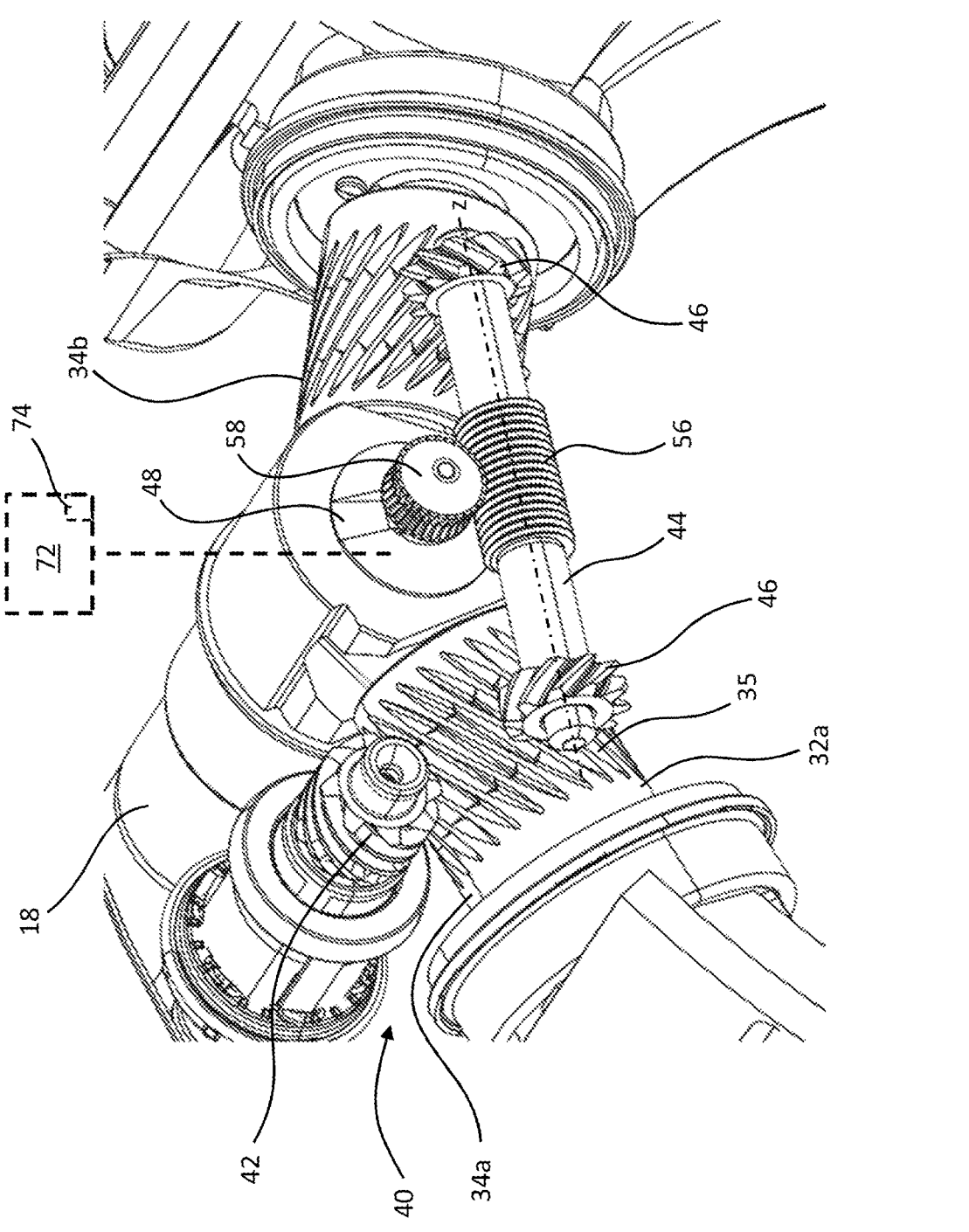
FIG. 3 is a detailed view of the drum brake assembly of FIGS. 1 and 2 with further components removed to improve clarity.
Figure 4:
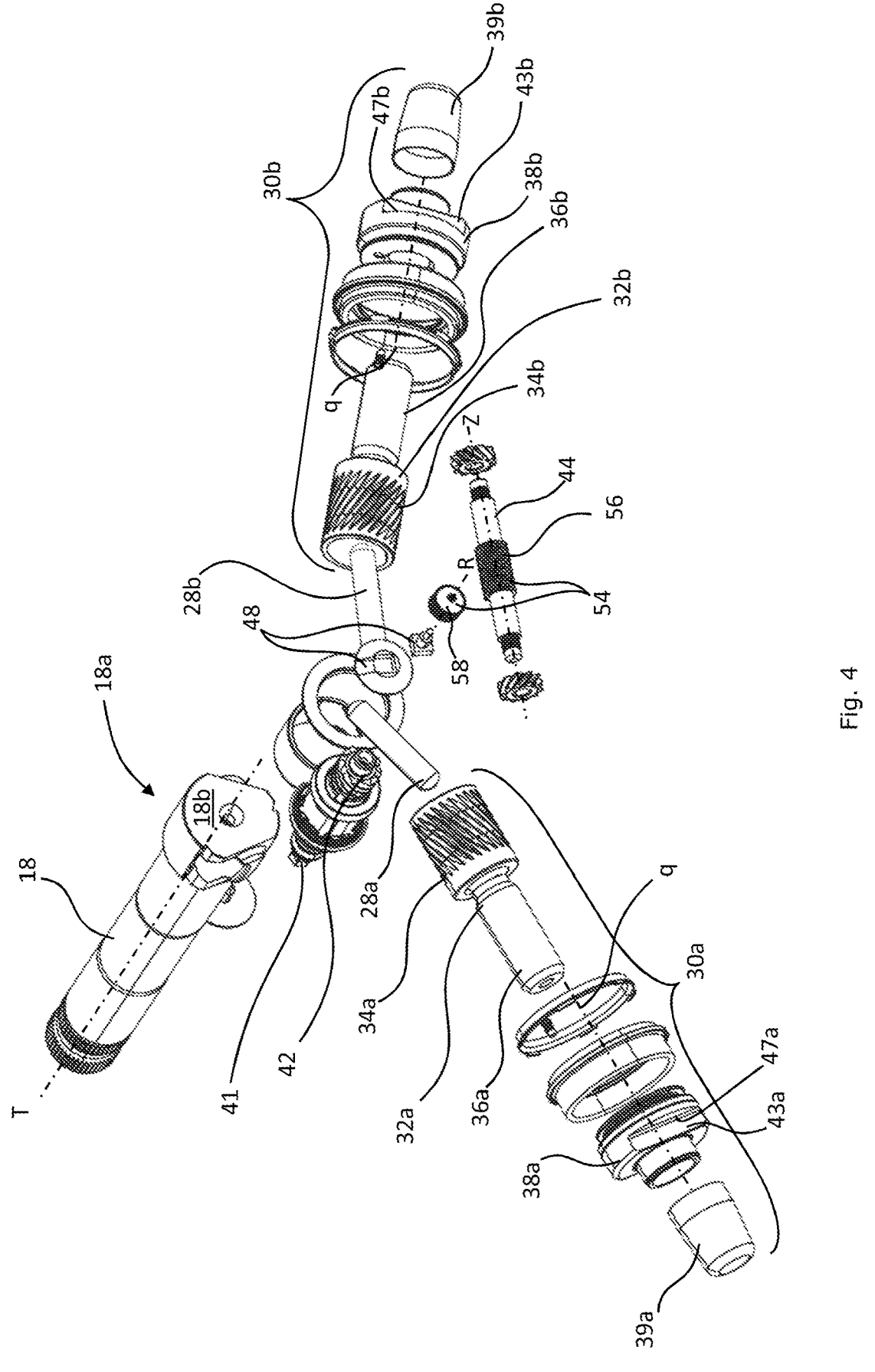
FIG. 4 is an exploded view of the manual adjuster assembly, cam shaft and tappets of the drum brake assembly of FIGS. 1-3.

As shown more clearly in FIGS. 3 and 4, the drum brake assembly 10 is a Z cam drum brake assembly. A pair of rods 28a, 28b are supported within a first end 18a of the cam shaft 18 such that angular displacement or rotation of the cam shaft 18 results in axial movement of each rod 28a, 28b as described above.

Axial movement of the rods 28a, 28b circumferentially outward from the cam shaft 18 results in substantially corresponding movement of respective first and second tappet assemblies 30a, 30b. The first and second tappet assemblies 30a, 30b transmit braking force from the cam shaft 18 to the first and second brake shoe assemblies 14, 16 respectively.

Each tappet assembly 30a, 30b is of a type known from the prior art, and includes a tappet 32a, 32b having a sleeve portion 34a, 34b and a body 36a, 36b. Each of the tappet sleeves 34a, 34b defines an array of spiral or oblique grooves or slots 35 around a periphery of the sleeve 34a, 34b. That is, the slots 35 are arranged helically, at an angle to a longitudinal axis Y of the tappet body 36a. In this embodiment, the slots 35 extend fully though the depth of the sleeve 34a, 34b. The body 36a, 36b is at least partially threaded.

A force transfer component 38a, 38b defining an internal thread corresponding to the external thread of the tappet body 36a, 36b is rotatably connected to the tappet body 36a, 36b. Upon application of the drum brake 10 each force transfer component 38a, 38b transmits braking force to the respective brake shoe assembly 14, 16 via flat surfaces 47a, 47b, extending substantially perpendicular to a longitudinal axis q of the respective force transfer component 38a, 38b. The force transfer components 38a, 38b are positioned between plates 45 on each brake shoe assembly 14, 16, such that flat surfaces 43a, 43b, extending in planes substantially parallel to the longitudinal axis q, engage the plates 45. A cover 39a, 39b protects the outer end of each force transfer component 38a, 38b.

The drum brake assembly 10 has a wear adjuster mechanism 40 for adjusting the first and second tappet assemblies 30a, 30b in response to wear of the brake shoes 14, 16 and the braking surface of the brake drum 12. The wear adjuster mechanism 40 acts to adjust the length of each of the first and second tappet assemblies 30a, 30b in response to wear, i.e., to increase the length of each tappet assembly 30a, 30b as wear of the friction material 24 and the braking surface occurs.

The wear adjuster mechanism 40 has a helical gear 42 that engages the oblique slots 35 of the first tappet sleeve 34a of the first tappet assembly 30a in order to rotate the tappet 32a with respect to the cover 38a and so extend the overall length of the tappet assembly 30a. Rotation of the force transfer components 38a, 38b is restricted by the plates 45.

Axial movement of the first tappet assembly 30a upon application of the drum brake 10 causes rotation of a shaft 41 of the wear adjuster mechanism 40 due to the engagement of the helical gear 42 with the slots 35 of the first tappet sleeve 34a. Once rotation of the shaft 41 reaches a certain point, resulting axial movement of the helical gear 42 in relation to the shaft 41, and the engagement of the helical gear 42 with the slots 35 of the first tappet sleeve 34a, cause rotation of the tappet 32a with respect to the cover 38a. The helical gear 42 rotates upon application of the drum brake 10. The first tappet sleeve 34a does not rotate with the helical gear 42. When the brake 10 is released, a form on the shaft 41 prevents rotation. The tappet sleeve 34a is thus forced to rotate with respect to the helical gear 42 upon activation of a shoe-return spring. That is, the tappet 32a rotates within the force transfer component 38a—rotation of which is prevented by the plates 45.

As in known adjuster mechanisms for Z cam brakes, the wear adjuster mechanism 40 has a cross shaft 44 for transmitting rotational force from the tappet sleeve 34a of the first tappet assembly 30a to the tappet sleeve 34b of the second tappet assembly 30b. The cross shaft 44 of this embodiment extends between the first and second tappet sleeves 34a, 34b, transverse to the first end 18a of the cam shaft 18. The cross shaft 44 has at each end a helical gear 46 for engagement with slots 35 of the respective tappet sleeves 34a, 34b. A single wear adjuster mechanism 40 is thus used to adjust both tappet assemblies 30a, 30b simultaneously in response to wear.

A sensor 48 is provided for detecting motion of the cross shaft 44. As the cross shaft 44 is rotated as the wear adjuster mechanism 40 is activated to address wear, the amount of wear of the friction material 24 and the braking surface can be calculated from the amount of rotation from the cross shaft 44 that has taken place. Detection of the rotation of the cross shaft 44 by the measurement of e.g., rotation of the cross shaft can thus be used to provide an indication of the amount of wear that has taken place.

Advantageously, detection of the amount of wear using the sensor 48 allows monitoring to take place, so that maintenance of the drum brake assembly can be planned and the brake shoes can be replaced appropriately on a predetermined schedule. The full usable life of the brake shoes 14, 16 can be utilized, reducing waste.

In this embodiment, the sensor 48 is for detecting rotation of the cross shaft 44 about a longitudinal axis Z. As the cross shaft 44 rotates in direct proportion to the amount by which the length of the first tappet 34a (and thus the second tappet 34b) is adjusted, by detecting the distance by which the cross shaft 44 has been rotated, the amount of wear can be calculated. Using rotation of the cross shaft 44 allows accurate calculation of wear, so that a replacement of the brake shoes 14, 16 can be accurately predicted.

In this embodiment, rotation of the cross shaft 44 is continuously detected. An up-to-date indication of the state of wear can therefore be provided.

In alternative embodiments, rotation of the cross shaft is detected at intervals.

In this embodiment, the sensor 48 is mounted on the cam shaft 18. In this embodiment, the sensor 48 is mounted at the first end 18a of the cam shaft 18. In this embodiment, the sensor 48 is mounted to an end face 18b of the cam shaft 18.

Location of the sensor 48 at the first end 18a of the cam shaft 18 allows the sensor 48 to be in a suitable and convenient location for the detection of rotation of the cross shaft 44, as the cross shaft 44 of this embodiment extends transverse to the first end 18a of the cam shaft 18. Advantageously, a compact arrangement is provided.

In alternative embodiments, the sensor 48 is mounted elsewhere on the cam shaft 18, for example, on a circumferential surface of the cam shaft 18. In alternative embodiments, the sensor 48 is mounted to a housing 50 of the drum brake assembly 10. In alternative embodiments, the sensor 48 is mounted to a cover plate 52 of the housing 50. Such an arrangement provides a compact assembly without the need for additional components, and allows the sensor to be suitably located for the detection of rotation of the cross shaft 44.

In the embodiment shown in FIGS. 2-4, where the sensor 48 is mounted to the cam shaft 18, the sensor 48 is configured to detect angular displacement of the cam shaft 18 about a longitudinal axis T of the cam shaft 18. Detection of angular displacement of the cam shaft during a braking operation provides an indication of the stroke of the cam shaft 18 for each application of the drum brake 10. When the stroke is known, running clearance can be determined, as the running clearance is known to be the distance travelled by the friction material 24 before the friction material 24 comes into contact with the braking surface. Monitoring of the running clearance over time will show if the brake wear adjuster mechanism is working correctly/optimally or if it is beginning to degrade. Service or maintenance can be planned if the running clearance is over a predetermined maximum distance, such that the brake is inefficient or under-performing, or if running clearance is below a predetermined minimum distance, and the brake is dragging.

As the stroke of the cam shaft 18 will be affected by the adjuster mechanism 40 adjusting the length of each of the first and second tappets 30a, 30b, this adjustment is taken into account when calculating running clearance from the stroke.

Mounting the sensor 48 on the cam shaft 18 allows the same sensor to be used to detect rotation of the cross shaft 44 and angular displacement of the cam shaft 18, allowing a minimal number of components and advantageously providing a compact arrangement.

In alternative embodiments, separate sensors, i.e., two or more sensors, are used to detect rotation of the cross shaft 44 and angular displacement of the cam shaft 18.

The drum brake assembly 10 has a rotation indicator 54 for indicating rotation of the cross shaft 44 of the sensor 48 i.e., to allow the sensor 48 to detect rotation of the cross shaft 44. The rotation indicator 54 has a first portion 56 and a second portion 58. The first portion 56 is moved by, or with, the cross shaft 44, i.e., in this embodiment, the first portion 56 rotates with the cross shaft 44 about the axis Z.

The second portion 58 is engaged with the first portion 56 in such a way that movement of the first portion 56—in this embodiment, rotation of the first portion 56 with the cross shaft 44—causes proportional movement of the second portion 58. The sensor 48 is arranged to detect the movement of the second portion 58, and so detect rotation of the first portion 56, so as to calculate rotation of the cross shaft 44.

In this embodiment, the first portion is a threaded portion 56 of the cross shaft 44. The threaded portion 56 provides a simple and effective means of moving the second portion proportionally to rotation of the cross shaft 44. In this embodiment, the first portion is an externally threaded sleeve 56. The sleeve 56 is splined to the cross shaft 44, so that the sleeve 56 rotates with the cross shaft 44.

In an alternative embodiment, the threaded portion is integral to the cross shaft, e.g., the threaded portion is machined with the cross shaft.

The second portion is in this embodiment in the form of a gear 58 that engages the threaded sleeve 56 in a worm drive arrangement, i.e., the gear 58 has a longitudinal axis R transverse to the longitudinal axis Z of the cross shaft 44. As the cross shaft 44 is rotated with the remainder of the adjuster mechanism 40, the threaded sleeve 56 causes the gear 58 to rotate about its axis R. The sensor 48 detects rotation of the gear 58 and so can measure rotation of the cross shaft 44, so that the amount of adjustment for wear carried out by the adjuster mechanism 40 is known, and the amount of wear can be calculated.

In this embodiment, the gear 58 is mounted on the cam shaft 18. In this embodiment, the gear 58 is mounted on the first end 18*a* of the cam shaft 18, at the end surface 18*b*. In this embodiment, the gear 58 is rotatably mounted to a projection of the sensor 48. Mounting of the gear 58 at the sensor 48, and at the first end 18*a* of the cam shaft 18, allows a compact arrangement without the need for multiple further components.

In alternative embodiments, the gear 58 is mounted in some other suitable location. In one embodiment, the gear 58 is mounted to the housing 50. In one embodiment, the gear 58 is mounted to the cover plate 52.

Figure 5:
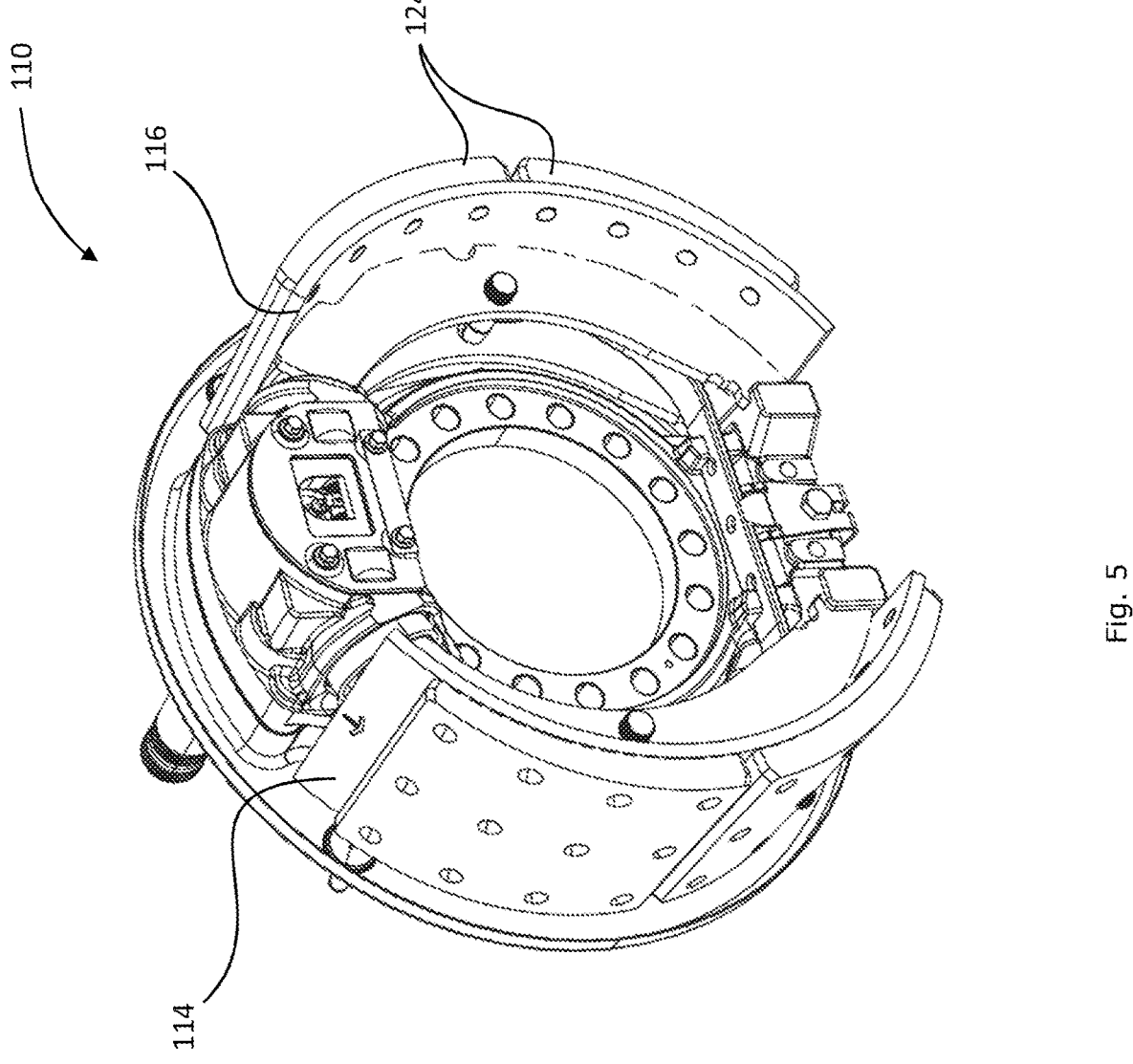
FIG. 5 is a perspective view of a drum brake assembly according to a second embodiment.
Figure 6:
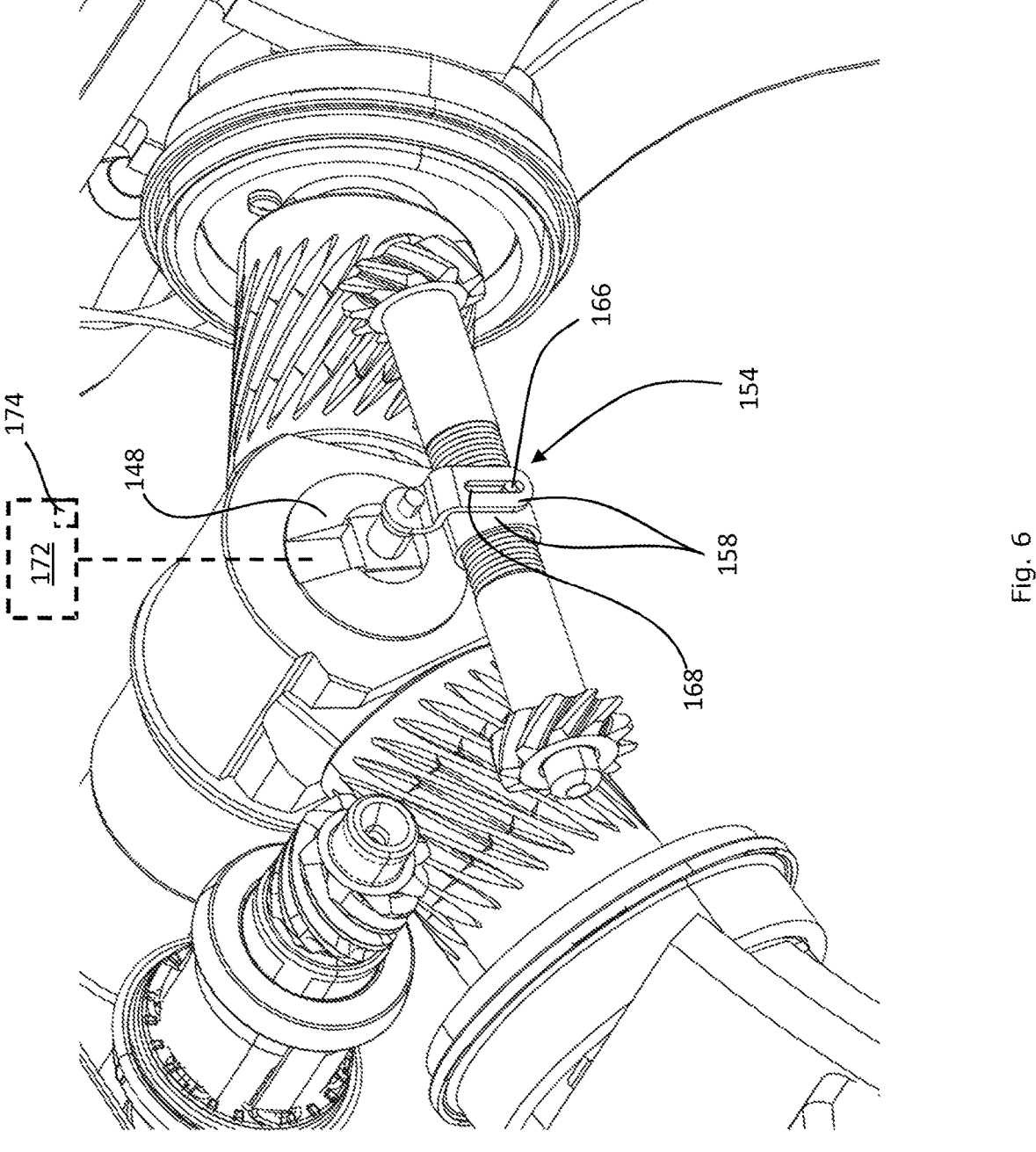
FIG. 6 is a detailed view of the drum brake assembly of FIG. 5 with further components removed to improve clarity.
Figure 7:
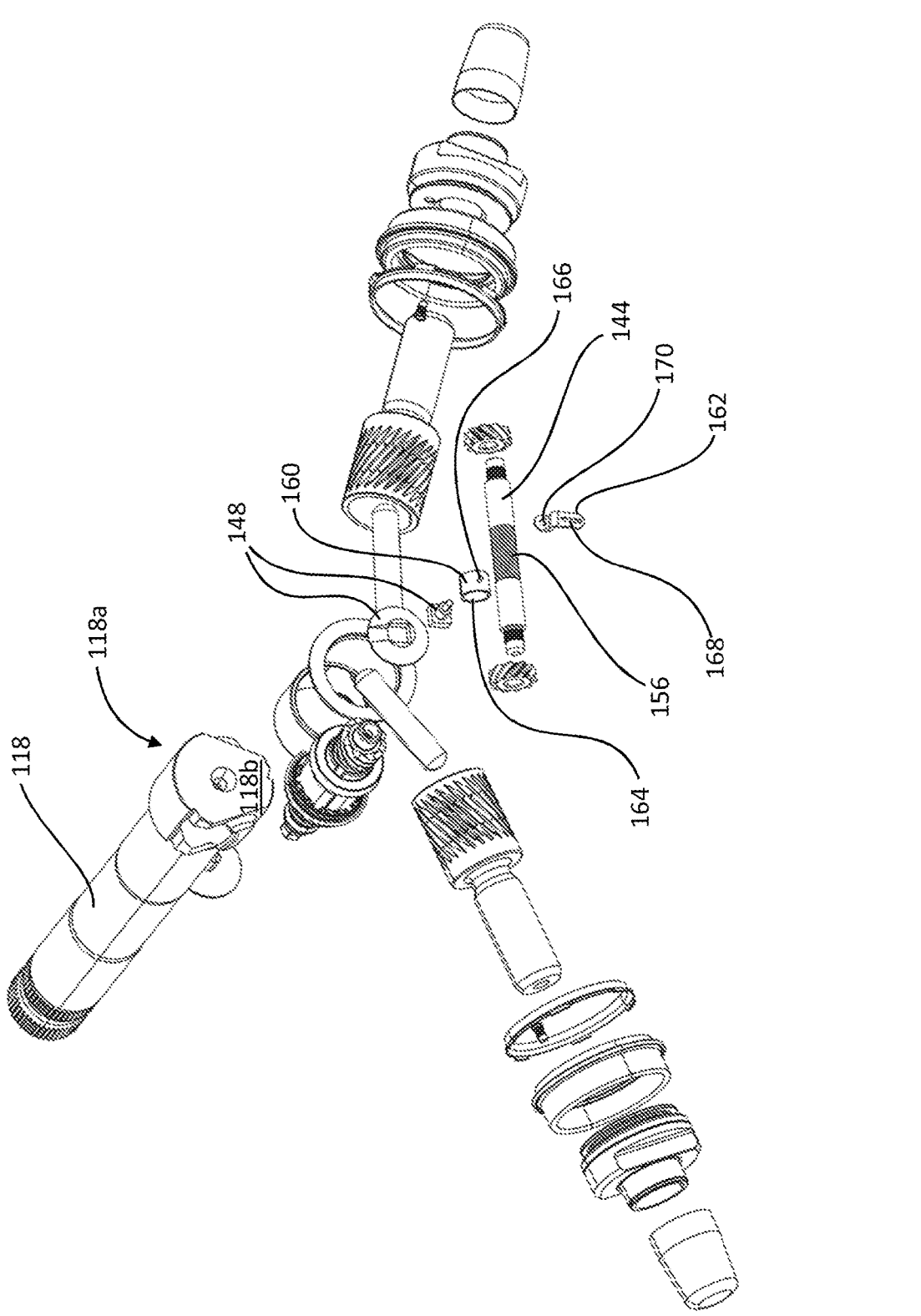
FIG. 7 is an exploded view of the manual adjuster assembly, cam shaft and tappets of the drum brake assembly of FIGS. 5 and 6.

With reference now to FIGS. 5, 6 and 7, a further embodiment is described. Only components that differ from the embodiment of FIGS. 2 to 4 will be described in detail. Like components are given the same reference number, with an additional prefix "1".

As shown in FIGS. 5, 6 and 7, in this embodiment, the rotation indicator 154 differs from that of the previous embodiment. In this embodiment, the first portion comprises a threaded portion 156. In this embodiment, the threaded portion 156 is integral to the cross shaft 144, i.e., a portion of the cross shaft 144 defines an external thread 156. In alternative embodiments, the threaded portion is provided on a sleeve as described in relation to the previous embodiment.

In this embodiment, the second portion 158 includes two components: a collar 160 and an arm 162. The collar is mounted on the cross shaft 144. The collar 160 defines an internal thread 164 which engages the threaded portion 156. The collar 160 is thus rotatable in relation to the cross shaft 144. The collar has an outward radial projection 166. The arm 162 engages the radial projection 166. In this embodiment, the arm 162 defines a slot 168 through which the projection 166 extends, providing engagement of the arm with the radial projection 166 and so with the collar 160. In this embodiment, the slot 168 is a closed slot.

In alternative embodiments, the arm has some other formation for engagement with the projection, or with the collar. For example, in one embodiment, the arm defines an open ended slot so that the arm forms a fork.

The engagement of the projection 166 with the arm 162 causes axial movement of the collar 160 along the cross shaft 144 when the cross shaft 144 is rotated. The arm 162 is pivotably secured at a first end 170. Axial movement of the collar 160 upon rotation of the cross shaft 144 results in pivoting of the arm 162 about the first end 170. The sensor 148 detects pivoting of the arm 162 and so detects rotation of the cross shaft 144.

In this embodiment, the arm 162 is mounted to the first end 118*a* of the cam shaft 118. In this embodiment, the arm 162 is mounted to the end face 118*b*. In this embodiment, where the sensor is mounted on a cam shaft, the arm 162 is mounted at its first end 170 to the sensor 148.

In alternative embodiments, the arm 162 is mounted elsewhere, for example to the housing, or to the cover plate.

The sensor 148 of the above embodiments is an encoder 48, 148. Such a sensor is simple and effective, providing accurate readings of the cross shaft 144. Such a sensor 48, 148 can detect angular displacement of the cam shaft 18, 118 as well as rotation of the gear 58 or arm 162, so that a single sensor can be used for multiple functions.

In an alternative embodiment, the sensor is of some other type. In an alternative embodiment, the sensor is a potentiometer. In alternative embodiments, this sensor is some other type of suitable sensor.

Monitoring of wear of the brake shoes 14, 16, 114, 116 is carried out by a control system 72, 172. The control system 72, 172 calculates wear from information provided by the sensor 48, 148, based on net motion of the cross shaft 44, 144 during multiple braking operations.

The control system 72, 172 includes an indicator 74, 174. The indicator provides an indication of the state of wear of the brake shoes 14, 16, 114, 116 and the braking surface. For example, the indicator 74, 174 provides an indication of the number of miles of use left in the brake shoes 14, 16, 114, 116, or the percentage thickness of friction material 24, 124 remaining.

As well as continuous monitoring of wear, the above arrangements advantageously allow the direction of rotation of the cross-shaft to be monitored.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A drum brake assembly comprising:
a brake drum;
first and second brake shoes that are moveable towards a braking surface of the brake drum during a braking operation;
a cam shaft that transmits braking force from an actuator to apply the brake;
a first tappet and a second tappet that transmit braking force from the cam shaft to the first and second brake shoes;
a wear adjuster mechanism that adjusts the first and second tappets to address wear of the first and second brake shoes and the braking surface of the brake drum, the wear adjuster mechanism including a cross shaft that transmits rotational force from the first tappet to the second tappet;
a sensor that detects rotation of the cross shaft about a longitudinal axis of the cross shaft in order to monitor wear of the first and second brake shoes and the braking surface of the brake drum; and
a rotation indicator that indicates rotation of the cross shaft to the sensor, wherein the rotation indicator includes a first portion that moves with the cross shaft, and a second portion engaged with the first portion such that movement of the first portion causes proportional movement of the second portion, wherein the sensor detects movement of the second portion,
wherein the first portion comprises a threaded portion of the cross shaft,
wherein the second portion comprises a collar mounted on the cross shaft, and an arm, wherein the collar comprises an internal thread that engages the threaded portion and a radial projection configured to engage the arm such that rotation of the cross shaft causes axial movement of the collar with respect to the cross shaft and pivoting of the arm about a first end of the arm, and wherein the sensor is configured to detect pivoting of the arm.

2. The drum brake assembly of claim 1 wherein the sensor is configured to continuously detect rotation of the cross shaft, such that wear of the first and second brake shoes and the braking surface is continuously monitored.

3. The drum brake assembly of claim 2 wherein the sensor is configured to detect angular displacement of the cam shaft about the longitudinal axis of the cam shaft.

4. The drum brake assembly of claim 1 wherein the threaded portion is integral to the cross shaft, or wherein the threaded portion comprises an externally threaded sleeve mounted to the cross shaft for rotation with the cross shaft.

5. The drum brake assembly of claim 1 wherein the sensor is an encoder, or wherein the sensor is a potentiometer.

6. The drum brake assembly of claim 1 further comprising a control system that monitors wear of the first and second brake shoes and the braking surface, wherein the control system calculates wear from cumulative motion of the cross shaft during multiple braking operations.

7. The drum brake assembly of claim 6 wherein the rotation indicator indicates a state of wear of the first and second brake shoes and/or the braking surface.

8. A method of monitoring wear of brake shoes and a braking surface of a drum brake assembly, the method comprising the steps of:

providing the drum brake assembly that includes:

a brake drum;

first and second brake shoes to be moved towards a braking surface of the brake drum during a braking operation;

a cam shaft that transmits braking force from an actuator to apply the brake;

a first tappet and a second tappet that transmit braking force from the cam shaft to the first and second brake shoes;

a wear adjuster mechanism that adjusts the first and second tappets to address wear of the first and second brake shoes and the braking surface of the brake drum, the wear adjuster mechanism including a cross shaft that transmits rotational force from the first tappet to the second tappet;

a sensor that detects rotation of the cross shaft about a longitudinal axis of the cross shaft in order to monitor wear of the first and second brake shoes and the braking surface of the brake drum;

a rotation indicator that indicates rotation of the cross shaft to the sensor, wherein the rotation indicator includes a first portion that moves with the cross shaft, and a second portion engaged with the first portion such that movement of the first portion causes proportional movement of the second portion, wherein the sensor detects movement of the second portion;

wherein the first portion comprises a threaded portion of the cross shaft;

wherein the second portion comprises a collar mounted on the cross shaft, and an arm, wherein the collar comprises an internal thread that engages the threaded portion and a radial projection configured to engage the arm such that rotation of the cross shaft causes axial movement of the collar with respect to the cross shaft, and pivoting of the arm about a first end of the arm, and wherein the sensor is configured to detect pivoting of the arm;

a control system that monitors wear of the first and second brake shoes and the braking surface;

wherein the control system calculates wear from cumulative motion of the cross shaft during multiple braking operations;

detecting motion of the cross shaft via the sensor; and using the control system to calculate wear from cumulative motion of the cross shaft.

9. The method of claim 8 further comprising the step of providing an indication to an operator of a state of wear of the first and second brake shoes and/or the braking surface.

10. A drum brake assembly comprising:

a brake drum;

first and second brake shoes to be moved towards a braking surface of the brake drum during a braking operation;

a cam shaft that transmits braking force from an actuator to apply the brake;

a first tappet and a second tappet that transmit braking force from the cam shaft to the first and second brake shoes;

a wear adjuster mechanism that adjusts the first and second tappets to address wear of the first and second brake shoes and the braking surface of the brake drum, the wear adjustment mechanism including a cross shaft that transmits rotational force from the first tappet to the second tappet;

a sensor that detects rotation of the cross shaft about a longitudinal axis of the cross shaft in order to monitor wear of the first and second brake shoes and the braking surface of the brake drum; and a rotation indicator that indicates rotation of the cross shaft to the sensor, wherein the rotation indicator includes a first portion that moves with the cross shaft, and a second portion engaged with the first portion such that movement of the first portion causes proportional movement of the second portion, wherein the sensor detects movement of the second portion, wherein the first portion comprises a threaded portion of the cross shaft, wherein the second portion comprises a collar mounted on the cross shaft, and an arm, wherein the collar comprises an internal thread that engages the threaded portion and a radial projection configured to engage the arm such that rotation of the cross shaft causes axial movement of the collar with respect to the cross shaft and pivoting of the arm about a first end of the arm, and wherein the sensor is configured to detect pivoting of the arm, and further comprising a control system that monitors wear of the first and second brake shoes and the braking surface, wherein the control system calculates wear from cumulative motion of the cross shaft during multiple braking operations.

11. The drum brake assembly of claim 10 wherein the threaded portion is integral to the cross shaft, or wherein the threaded portion comprises an externally threaded sleeve mounted to the cross shaft for rotation with the cross shaft.

12. The drum brake assembly of claim 10 wherein a first end of the arm is mounted on the cam shaft, and wherein, when the sensor is mounted on the cam shaft, the first end of the arm is mounted on the cam shaft via the sensor.

13. The method of claim 8 wherein the first end of the arm is mounted on the cam shaft, wherein, when the sensor is mounted on the cam shaft, the first end of the arm is mounted on the cam shaft via the sensor.

\* \* \* \* \*